3,262,966
PURIFICATION OF ACRYLONITRILE
Thomas D. Higgins, Jr., and David W. McDonald, Texas City, and Robert G. Roth, Dickinson, Tex., assignors to Monsanto Company, St. Louis, Mo., a corporation of Delaware
No Drawing. Filed July 22, 1963, Ser. No. 296,490
3 Claims. (Cl. 260—465.9)

This application is a continuation-in-part of our copending application Serial No. 10,101, filed February 23, 1960, now abandoned.

The present invention relates to the purification of acrylonitrile. More specifically, it relates to a process for treating acrylonitrile containing minor amounts of carbonyl-containing impurities for removal of such impurities therefrom.

Acrylonitrile is a well known article of commerce widely used in the manufacture of synthetic resins and fibers. It is also a valuable intermediate in the synthesis of many organic compounds. In most applications, it is essential that the acrylonitrile be in as pure a state as possible because even minute traces of impurities are often a direct cause of either extremely low yields of the desired products or inferior qualities in the end product. This is particularly true when acrylonitrile is used in the preparation of synthetic resins and fibers. In most of the processes for producing this nitrile, minor amounts of carbonyl-containing compounds such as methyl vinyl ketone, acetone, acrolein, methacrolein, crotonaldehyde, acetaldehyde, biacetyl, and other similar carbonyl compounds are simultaneously produced. The presence of even very small quantities of such impurities renders the acrylonitile unsuitable for many applications. For example, any methyl vinyl ketone present copolymerizes with acrylonitrile when the nitrile is polymerized for eventual end-use as a fiber. The resulting copolymer is more susceptible to dyes than is the homopolymer and this leads to a fiber product made from acrylonitrile containing this ketone having uneven color distribution when subjected to dyeing. Also, in acrylonitrile polymerization processes, any acetone present in the acrylonitrile acts as a diluent successively building up in the polymerization system so that it changes relative concentrations in the polymerization recipe and has a consequent deleterious effect on yields in the system. Thus, it is evident that it is imperative that such carbonyl impurities be essentially completely removed from the acrylonitrile of commerce if it is to be successfully marketed.

Accordingly, it is an object of this invention to provide a process for the removal of minor amounts of carbonyl-containing impurities from acrylonitrile.

Other objects and advantages of the invention will become apparent from the following description thereof.

In accordance with the invention, acrylonitrile can be effectively freed of carbonyl compounds of the type represented by the formula

wherein R and R' are alike or different and are chosen from the group consisting of hydrogen, and alkyl, alkylene, and acyl radicals by bringing the nitrile containing such impurities in substantially anhydrous conditions into intimate contact with activated alumina by slurrying the activated alumina with the nitrile or by percolating the acrylonitrile through a column packed with activated alumina. The latter method is the preferred one since it is adaptable to continuous operation which is the most practical and efficient method of industrial use.

By "substantially anhydrous" acrylonitrile in this specification and in the accompanying claims is meant acrylonitrile containing a maximum of 0.2% by weight of water. Preferably, the acrylonitrile being treated should contain less than 0.1% water and optimum results are obtained with anhydrous acrylonitrile. Amounts of water is excess of the maximum specified are objectionable because treatment of acrylonitrile containing such quantities of water with activated alumina results in elution of reaction products of the carbonyl compounds from the alumina. This phenomenon is attributable to the fact that water is preferentially adsorbed by the alumina thus displacing the adsorbed reacted impurities. The impurities thus added are as undesirable as the original contaminants and no gain in purification of the monomer is realized.

For efficient removal of the carbonyl compounds according to the present invention, at least 50 grams of activated alumina per gram of total carbonyl impurities present are employed. Satisfactory treatment is usually effected with from about 50 g. to about 200 g. of activated alumina per gram of total carbonyl impurities present.

The invention is illustrated in the following examples which, however, are not to be considered as limiting it in any manner whatsoever.

*Example 1*

A sample of activated alumina in 48–100 mesh size marketed by Aluminum Company of America and known to the trade as "F–1" was heated in a shallow open dish in an oven at a temperature of about 300° C. for a period of approximately 16 hours. The alumina was then cooled and 10 g. of it was introduced into a 100-gram sample of acrylonitrile containing 0.01% by weight of water, 1020 parts per million of acetone and 70 parts per million of methyl vinyl ketone and other unsaturated carbonyl compounds. The resulting mixture was stirred for one hour at room temperature (24° C.) after which it was filtered to recover the acrylonitrile for analysis. Upon analysis, the treated acrylonitrile was found to contain only 730 parts per million of acetone and no methyl vinyl ketone or other unsaturated carbonyl compounds.

*Example 2*

The procedure of Example 1 was repeated with the exception that prior to heating the alumina, it was washed with 0.1 N hydrochloric acid and then washed free of acid with water. The acrylonitrile treated was from the same source as that of Example 1 and contained the same kind and quantity of carbonyl impurities. The recovered acrylonitrile in this instance after contact with acid-treated alumina contained only 655 parts per million of acetone and no methyl vinyl ketone or other unsaturated carbonyl compounds.

*Example 3*

A glass column, approximately 28 mm. in inside diameter and about 20 in. long, was packed with 220 g. of activated alumina of 8–14 mesh particle size. The alumina employed was activated alumina known to the trade as "F–3" marketed by Aluminum Company of America. About 2 liters of acrylonitrile containing about 1400 parts per million of water, 600 parts per million of acetone, 500 parts per million of methyl vinyl ketone, and very minor amounts of crotonaldehyde and other unsaturated carbonyl compounds was passed through the column at a rate of approximately 6 ml./min. at room temperature (24° C.). Samples of the effluent nitrile were collected at 30-minute intervals and analyzed for carbonyl content. Analytical results established that the first 500 ml. of acrylonitrile recovered from the column was completely and totally free of the acetone, methyl vinyl ketone, crotonaldehyde and other unsaturated carbonyl compounds it had previously contained. The remaining effluent samples contained no methyl vinyl ketone or other unsaturated carbonyl compounds whatsoever but did contain acetone in amounts ranging from 43 to 600 parts per million. Also, a sizeable reduction in the acetonitrile content of the acrylonitrile was simultaneously effected.

*Example 4*

The column of Example 3 was packed with regenerated activated alumina, i.e., activated alumina which had been used for purifying acrylonitrile as described in the previous example and then subjected to treatment by washing with water, drying, and subsequent heating at a temperature of from about 205° to about 360° C. with nitrogen to drive off any adsorbed impurities and reactivate the alumina. This particular alumina had been regenerated six times. A sample of acrylonitrile containing substantially the same kind and proportions of carbonyl impurities and water as that of Example 3 was passed through this column at a rate of about 6 ml./min. at room temperature. Again, it was determined by analysis of the effluent samples of acrylonitrile that methyl vinyl ketone and the unsaturated carbonyl compounds had been completely removed from the whole sample ($\sim$2 liters) by one pass through the column and that a good proportion of the acetone present had also been removed by the treatment.

*Example 5*

A stainless steel column 3.5 in. in inside diameter and about 36 in. long was packed over about 30 in. of its length with 3208 g. of activated alumina of 20–80 mesh particle size. About 31.2 liters of acrylonitrile containing 50 parts per million of water, 725 parts per million of acetone, 500 parts per million of methyl vinyl ketone, 70 parts per million of methacrolein, 30 parts per million of crotonaldehyde, and 5.7 parts per million of biacetyl was passed through the column at a rate of 40 ml. per minute at ambient temperature (24° C.). A sample of the acrylonitrile effluent from the column was analyzed and found to contain only 75 parts per million of acetone and less than one part per million of methyl vinyl ketone, methacrolein, crotonaldehyde, and biacetyl, respectively.

*Example 6*

A 500-gram sample of acrylonitrile containing 400 parts per million of acetaldehyde was passed through a glass column 1 in. x 12 in. packed with 51 grams of activated alumina of 20–80 mesh particle size. Rate of flow of the nitrile through the column was about 20 ml./min. Analysis of the effluent acrylonitrile collected showed that it contained less than one part per million of acetaldehyde.

The purification process of the invention is not to be considered limited to the precise conditions or mode of operation set out in the examples. Any activated alumina, for example, of the many which are available can be employed. Preferred because of its relatively higher efficiency, is an activated alumina which has been pretreated before use by washing with dilute hydrochloric acid followed by reactivation. Reactivation is generally effected by heating the acid-washed activated alumina at temperatures from about 200° to about 600° C. Where sizeable quantities are involved, heating is effected with air or a dry inert gas such as methane or nitrogen. Preferred reactivation temperatures vary depending upon the source or type of alumina. With certain types of alumina, reactivation temperatures at the low end of the range, i.e., from about 200° to 400° C., must be employed to avoid calcining of the alumina. With the more heat-resistant aluminas, however, such precautions are not required and more effective reactivation is achieved by using the higher temperatures, i.e., from 400° to 600° C.

In carrying out the process of the invention, the temperature at which the adsorption treatment is conducted is most conveniently the ambient temperature of the area. However, there is no reason why temperatures lower than the ambient temperature cannot be used, provided that they are kept within the range at which the acrylonitrile flows sufficiently readily for easy handling. Likewise, temperatures above the ambient can be employed so long as they are kept well below that at which acrylonitrile begins to polymerize. However, such higher temperatures are less efficient.

The process may be either a batch or a continuous one although the latter employing standard adsorption columns is by far the preferred operation from a commercial standpoint.

The time of contact depends upon the amounts of carbonyl impurities present and activated alumina used, the particle size of the activated alumina, and the efficiency of removal desired. The period during which the nitrile is in contact with the activated alumina may be controlled in the percolation method, for example, by adjustment of the length of the column. In practical operation, a series of columns may be employed, the outflow from one column, if it is incompletely purified of carbonyl impurities, being cycled through the next, until the effluent acrylonitrile is completely freed of carbonyl impurities.

Regeneration of activated alumina which is spent by use in the process of the invention may be accomplished in the usual manner by heating with air or an inert gas such as natural gas, carbon dioxide, or nitrogen at temperatures from about 200° to about 600° C. depending upon the original alumina employed for a period of time sufficient to drive off adsorbed impurities and "reactivate" the alumina, i.e., remove adsorbed moisture from it. The gas is generally heated externally and circulated through the column preferably in a reverse direction to that of the flow of acrylonitrile during the treating period. The most efficient "regenerated" alumina and that with the longest service life is activated alumina which has been acid-washed and reactivated prior to its original use in the process of the invention and thereafter regenerated when spent by washing with water, steam or methanol prior to the application of heat for removal of any adsorbed materials and reactivation.

What is claimed is:

1. A process for purifying acrylonitrile containing minor amounts of carbonyl compounds selected from the group consisting of methyl vinyl ketone, acetone, acrolein, methacrolein, crotonaldehyde, acetaldehyde and biacetyl which consists of essentially of intimately contacting said acrylonitrile in the liquid state in substantially anhydrous condition with at least 50 grams of activated alumina per gram of total carbonyl compounds contained in the acrylonitrile, said treatment being effected at a temperature at which said acryonitrile flows and below which said acrylonitrile begins to polymerize, and collecting effluent acrylonitrile substantially free of said carbonyl impurities.

2. The process of claim 1 wherein said activated alumina has been washed with dilute hydrochloric acid and then reactivated by heating at a temperature from about 200° to about 600° C.

3. The process of claim 1 wherein said activated alumina is activated alumina which has been subjected to washing with dilute hydrochloric acid followed by reactivation at a temperature within the range from about 200° to about 600° C., then spent in the removal of carbonyl compounds from acrylonitrile, subsequently regenerated by washing with water, and reactivated by heating with a dry inert gas at a temperature within the range from about 200° to about 600° C.

(References on following page)

References Cited by the Examiner

UNITED STATES PATENTS

| | | | |
|---|---|---|---|
| 2,374,052 | 4/1945 | Spence et al. | 260—465.9 |
| 2,622,097 | 12/1952 | Osborne | 260—465.9 |
| 2,678,945 | 5/1954 | Taylor | 260—465.9 |
| 2,684,979 | 7/1954 | Wenner et al. | 260—465.9 |
| 2,770,644 | 11/1956 | Owens | 260—465.9 |
| 2,770,645 | 11/1956 | McDonald | 260—465.9 |
| 2,820,812 | 1/1958 | Lichtenberger et al. | 260—465.9 X |

CHARLES B. PARKER, *Primary Examiner.*
JOSEPH P. BRUST, *Assistant Examiner.*